LAYER TYPE STORAGE LIGHT AMPLIFIER
Filed Dec. 1, 1959
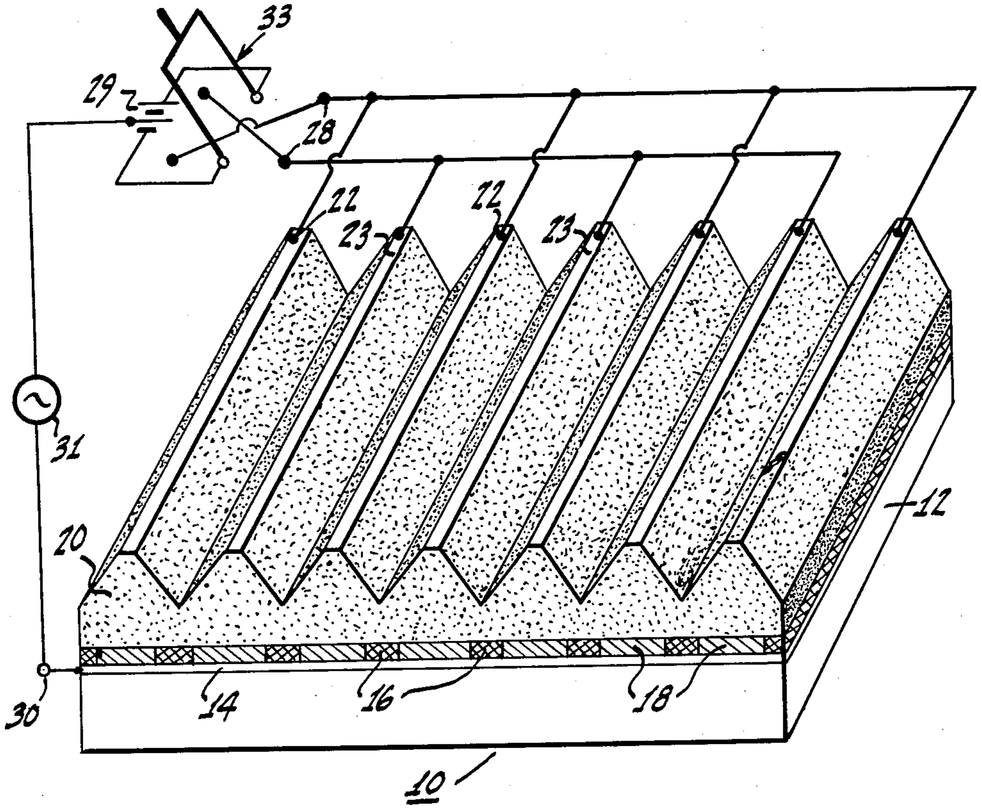
INVENTORS:
John Murr, Jr &
Harvey O. Hook
BY L. A. Larsen
ATTORNEY 3,064,133

LAYER TYPE STORAGE LIGHT AMPLIFIER

John Murr, Jr., Allentown, and Harvey O. Hook, Princeton, N.J., assignors to Radio Corporation of America, a corporation of Delaware Filed Dec. 1, 1959, Ser. No. 856,606
6 Claims. (Cl. 250—213)

This invention relates to storage light amplifiers. In particular, this invention relates to an improved storage light amplifier of the type including an electroluminescent phosphor.

Prior to this invention, many storage light amplifiers have been designed. Many of these designs have included an electroluminescent phosphor. Generally, these light amplifiers include both an electroluminescent phospor material and a photoconductive material. The two materials are arranged so that, with a potential applied across both materials and the photoconductor in the dark, the voltage drop across the photoconductive material is sufficiently high so that no light is produced or emitted by the electroluminescent material. When the resistance of the photoconductor is decreased, e.g. by directing a light image thereon, a larger portion of the voltage is applied across the electroluminescent material causing light to be emitted therefrom in proportion to the input image. Since the photoconductor is normally arranged in light exchange or feedback relationship with the electroluminescent phosphor, the light will be continuously emitted by coupling the light from the electroluminescent phosphor back to the photoconductor.

In devices of the type briefly described above, there are certain problems of mechanical construction or fabrication. As an example, if the device is to be used for image reproduction and image storage, the electroluminescent element and/or the photoconductor, must be divided into optically isolated elemental areas to prevent lateral spreading of the image. As is obvious, the optically isolated areas of either the photoconductor or the electroluminescent phosphor must be at least as fine or small as the picture definition required by the ultimate use of the device. When one attempts optically to isolate sufficiently small elemental areas, the fabrication of the device is extremely difficult.

It is therefore an object of this invention to provide an improved storage light amplifier.

It is a further object of this invention to provide a novel storage light amplifier which is adapted to store and intensify an image and which may be easily fabricated.

These and other objects are accomplished in accordance with this invention by providing a storage light amplifier that includes an electroluminescent phosphor which is divided into elemental optical areas by means of an opaque mesh. The phosphor is positioned substantially within the plane of the mesh and is covered by a photoconductor to form a light amplifying and/or storage sandwich. Electrodes, at least one of which is transparent, are provided on opposite surfaces of the device.

The invention will be more clearly understood by reference to the accompanying single sheet of drawings, wherein:

The single FIGURE is a partially perspective view of a light amplifier in accordance with this invention.

Referring now to the figure in detail, an electroluminescent light amplifier 10 is provided that is capable of intensifying a light image and/or storing the light image and is substantially free of picture spreading or image dilution. The light amplifier 10 comprises a transparent support member 12. On the transparent support member 12 there is provided a light transparent electrically conductive coating or member 14. On the transparent conducting coating 14, there is provided a light opaque mesh 16. Within the apertures of the opaque mesh 16, there is provided an electroluminescent phosphor, which is contained within the plane of the mesh 16. Thus, the electroluminescent phosphor material is in the shape of a plurality of optically isolated electroluminescent dots or areas 18. Covering the exposed ends of the electroluminescent dots 18, and the light opaque mesh 16, is a photoconductor 20 which is preferably grooved as shown. The purpose of the grooved structure is to provide a low capacitance along with a highly light sensitive surface. The grooves in the photoconductor 20 are arranged in registration with the wires of the opaque mesh 16. However, this registering arrangement is not intended to limit this invention since other non-registering arrangements can be used in accordance with this invention. On each of the "hills" of the photoconductor 20, there is provided a different conducting strip 22 or 23. The conducting strips 22, on alternate "hills," are all connected together and to one of a pair of terminals 28, while the conducting strips 23, on the remaining "hills," are all connected together and to the other one of the pair of terminals 28.

During operation, a source of direct current potential 29, indicated by the conventional battery, is connected between the terminals 28. Also, an alternating current source 31 is connected between a center tap on the D.C. source and to a terminal 30. In such an arrangement, and with the photoconductor in the dark, there is no light produced by the electroluminescent dots 18 because of the high resistance of the photoconductor 20. When a light image is directed onto the photoconductor 20, the resistance of the photoconductor in the illuminated areas is decreased so that more of the alternating current source voltage is applied across the registered areas of the electroluminescent dots 18. Thus, because of this increased voltage, light is emitted from the electroluminescent dots that are in registration with the input light image. A portion of the electroluminescent light thus produced, is fed back to the photoconductor, to further decrease the resistance thereof, and thus increase or intensify the image produced by the electroluminescent dots 18. Since the photoconductor 20 and the electroluminescent dots 18 are in electrical series across the alternating current source 31, the image will be stored until either the alternating current source is removed, or the polarity of the direct current source is reversed by switch 33.

It should be noted that, due to the electroluminescent phosphor being divided into optically isolated dots 18 by means of the opaque mesh 16, the light from the electroluminescent dots feeds back in a substantially straight line, i.e. directly above each dot 18, and does not spread to other adjacent areas of the photoconductor layer 20. Thus, no dilution of the original image occurs, due to light spreading, in the improved light amplifier storage device in accordance with this invention.

The electroluminescent device 10 may be fabricated as follows:

The substrate 12 may be any light transparent support, e.g. glass. In order to facilitate machining operations later in the fabrication of the structure 10, the transparent member 12, upon which the structure is built, should be chosen carefully for flatness and parallelism.

The transparent conductive coating 14 is applied to the glass 12 by using, for example, a solution of stannous chloride in acetic acid sprayed onto the surface of the glass 12 while the glass is at a temperature of approximately 550° C. The glass 12 is supported on a flat surface (not shown) during this operation.

The opaque mesh 16 is then silk-screened onto the conductive coating 14 on the glass 12. The silk screen can be a pattern produced by a photographic process on gelatin paper, such as that made by Chemo Products Co., Glen Cove, L.I., and transferred to a stainless steel mesh supported in an aluminum frame. A suitable silk screen ink can be made by adding inert filler material to a black silk screen ink such as Sherwin-Williams D22B2. One satisfactory procedure is to mix two parts by weight of the ink to three parts by weight of titanium dioxide moistened with acetone and then allow the acetone to evaporate. Moistening the titanium dioxide with acetone makes it easier to mix and to provide a lump free silk screen material. The mixture should be thick and nonflowing. Detailed procedures on the silk screen process can be obtained from suppliers of the silk screen materials and inks. The screen-printed mesh should then be cured in accordance with the manufacturer's instructions for the silk screen ink.

The electroluminescent layer 18 may then be spread into the apertures of and not above, the opaque mesh 16 by using a doctor blade. One suitable example of a mixture for the electroluminescent layer is 45 grams of an electroluminescent phosphor, e.g. fine sulfide powder, when mixed with a 25 grams of suitable epoxy resin, 3 grams of a reactive diluent, and 3 grams of a hardener. The mixture may be heated to approximately 50° C. to facilitate mixing. As soon as thorough mixing is accomplished, the composition is ready to apply by doctor blading as previously stated. The electroluminescent layer should be cured for approximately 2 hours at approximately 125° C.

Alternatively, the electroluminescent dot-opaque mesh matrix may be made by first depositing the electroluminescent dots by a silk screening process. Then, after curing, the electroluminescent dots are covered with opaque material, for example a paint compound of carbon black in an epoxy resin may be sprayed on after curing. The resulting layer is machined to the proper thickness, about .0015 inch, exposing the electroluminescent dots between the opaque mesh. If the electroluminescent dots are deposited to the proper thickness, for example by spraying or settling through a mask, the opaque mesh can be cast by known doctor blading techniques between the electroluminescent dots and the machining eliminated.

The photoconductor layer is then spread over the electroluminescent layer using spacers (not shown) to get the desired thickness to provide a photoconductor thickness of approximately 0.010", the layer thickness most frequently used. A suitable mixture for the photoconductor layer consists of 60 grams of a stock solution containing one part by weight epoxy resin, 0.1 part by weight hardener, 5 parts by weight diacetone alcohol; and 180 grams of photoconducting powder, e.g. cadmium sulfide. This material may be spread using the doctor blade. Sometimes, for smoothing, the doctor blade may be tilted slightly so that the long flat side is slightly higher in front than at the back. The photoconductor layer is cured by heating at 60° C. for at least 48 hours.

An electrode, which is now applied for the eventual formation of the electrodes 22 and 23, is formed by spraying silver, with a relatively dry spray, keeping the spray gun approximately 12" from the work. The spray mix can be made using 30 grams of conductive silver paint such as DuPont No. 4817, 15 grams of toluene, 15 grams of xylene. This combination is mixed with a high speed blender for three minutes, or ball milled for several hours, to assure complete mixing before using.

The photoconductor 20 is then grooved by using a multiple cutting tool (not shown). This tool may be mounted in a tool holder which gives approximately 3° negative rake to the tool. For machining the grooves in the photoconductor, the storage light intensifier structure is fastened to a flat plate. The multiple tool is then set up true and parallel to the flat plate. The grooves are cut in successive tool passes, while feeding the tool down into the photoconductor layer, until the desired groove depth is obtained. Groove depths of from 0.005" to 0.008" have been used in 0.010" thick photoconductor layers. The deeper grooves make erasing slightly easier but do not seem to increase the input sensitivity or change the feedback factor appreciably. Deeper grooves tend to accentuate non-uniformities because the percentage difference in the thickness of remaining photoconductor becomes larger as its total thickness becomes smaller. This type of non-uniformity is accentuated when the biased A.C. type of operation is used.

What is claimed is:

1. An electroluminescent light amplifying device comprising a light-opaque mesh-like structure including a plurality of apertures, electroluminescent phosphor means positioned in said apertures and substantially within the plane of said mesh whereby said electroluminescent phosphor means is dividend into a plurality of areas, and a continuous photoconductive surface extending over all of said areas.

2. An electroluminescent device comprising a plurality of spaced apart electroluminescent phosphor areas, light opaque means extending between adjacent ones of said areas and a continuous photoconductive means extending across all of said areas.

3. A storage amplifier comprising a support member, a conductor on said support, a plurality of spaced apart electroluminescent phosphor dots on said conductor, light shield means isolating each of said phosphor dots from the balance of said phosphor dots, a photoconductor on said phosphor dots, said photoconductor having a continuous surface that extends across substantially all of said phosphor dots, and at least one electrode on said photoconductor.

4. A storage light amplifier as in claim 3 wherein said phosphor dots and said light shield means are substantially coextensive and in the same plane.

5. A light amplifier comprising a transparent support member, a transparent electrically conductive coating on one surface of said support member, a light opaque mesh-like member on said transparent conductive coating, a plurality of dots of electroluminescent phosphor spaced apart on said transparent support member, each of said dots being in a different one of the apertures in said light opaque mesh-like member, a photoconductor on said dots and on the light opaque mesh-like member between said dots, the surface of said photoconductor removed from said dots being grooved, a plurality of strip-like conductors, the alternate ones of said strip-like conductors being electrically connected together and positioned on alternate peaks of said photoconductor, and the intermediate ones of said strip-like conductors being electrically connected together and positioned on the intermediate peaks of said photoconductor.

6. An electroluminescent device comprising a plurality of isolated electroluminescent phosphor means, and a continuous photoconductive means in direct contact with all of said isolated electroluminescent phosphor means.

References Cited in the file of this patent

UNITED STATES PATENTS

| | | |
|---|---|---|
| 2,839,690 | Kazan | June 17, 1958 |
| 2,916,630 | Rosenberg | Dec. 8, 1958 |
| 2,884,541 | Nicoll | Apr. 28, 1959 |
| 2,942,120 | Kazan | June 21, 1960 |